Patented Apr. 9, 1940

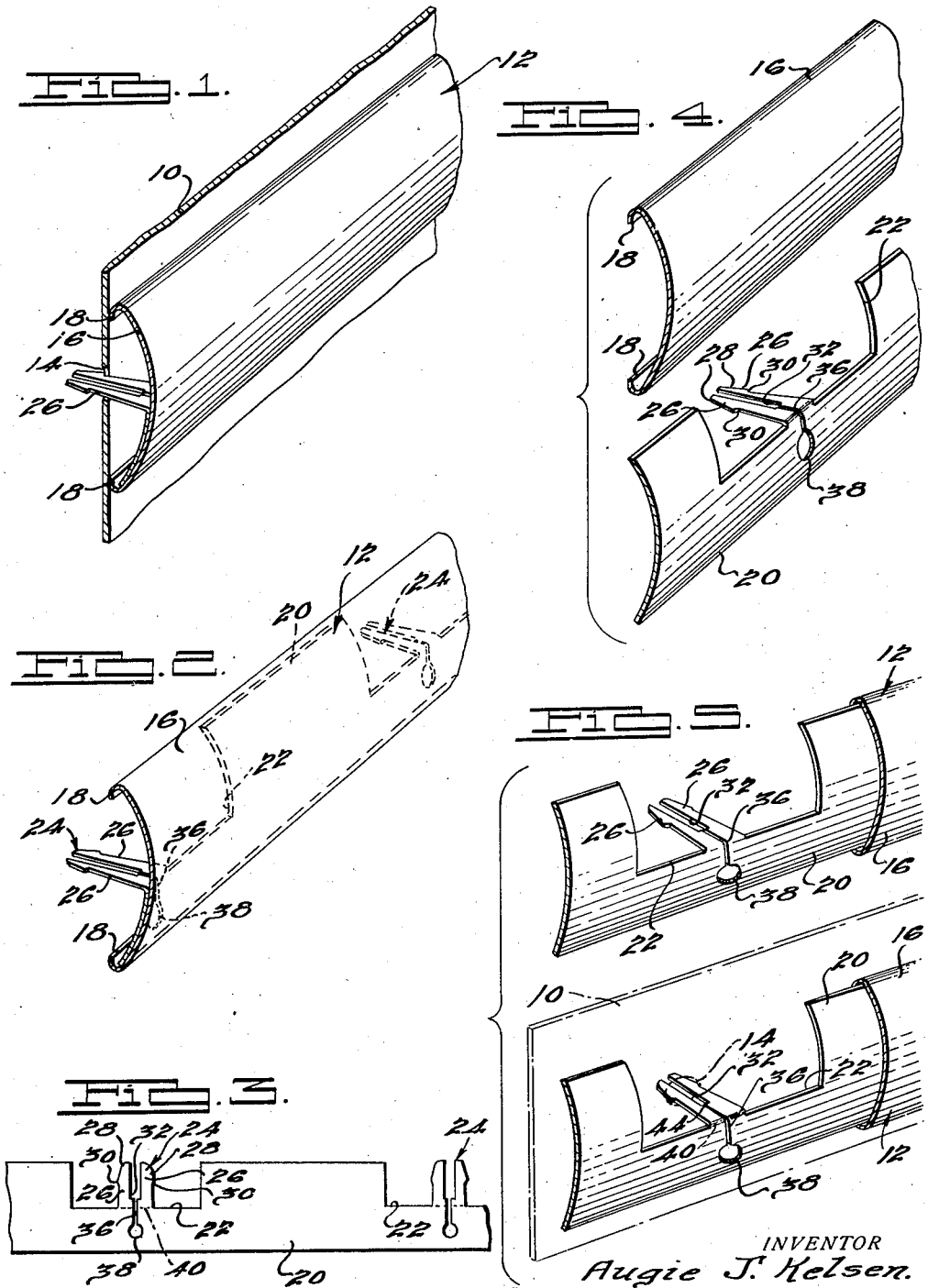

2,196,417

UNITED STATES PATENT OFFICE 2,196,417

MOLDING AND MEANS FOR ATTACHING SAME

Augie J. Kelsen, Detroit, Mich., assignor of one-third to John Gibson, Detroit, Mich., and one-third to William A. Mitchell, Grosse Pointe, Mich.

Application September 1, 1938, Serial No. 227,993

3 Claims. (Cl. 189—88)

The present invention relates to improved moldings or finish strips, particularly such as those used on automobile bodies, although such moldings may also be used on other objects as well.

One of the primary objects of the present invention is to provide an improved molding including a fastening means so constructed and arranged that the molding may be readily attached to a supporting member, such as an automobile body, and will not be worked loose in use.

Another object of the invention is to provide an improved molding in which the attaching means is an integral part of the molding and in which the improved attaching means is provided in an improved and simplified manner.

Another object of the invention is to provide an improved attaching means which is integral with the molding and which positively and securely locks the molding in place on a supporting member by a simple press snapping operation.

Another object of the invention is to provide an improved molding having integral attaching means which may be applied to a supporting member without the use of separate clips such as those required in prior structures.

Other objects of the invention will become apparent from the following specification, the drawing relating thereto, and from the claims hereinafter set forth.

In the drawing, in which like numerals are used to designate like parts in the several views throughout:

Figure 1 is a perspective view of an embodiment of a molding, according to the present invention, attached to a supporting member;

Figure 2 is a view similar to Figure 1 with the supporting member removed and showing certain parts in dotted lines;

Figure 3 is a fragmentary plan view of one of the members forming the molding in one stage of its manufacture according to the present invention;

Figure 4 is a fragmentary, exploded perspective view of the structure shown in Figure 2; and Figure 5 is a combination perspective view illustrating, in an exaggerated manner, the action of the attaching means as it is applied to a supporting member according to the present invention.

Referring to the drawing, a supporting member 10 is illustrated which may be an automobile body panel or the panel of another object, to which a composite molding, generally indicated at 12, is attached. The supporting member 10 is provided with openings 14 therethrough which are preferably round and which are spaced at predetermined points along the supports. Such openings are adapted to receive therein the attaching means of the molding in a manner which will be described in greater detail hereinafter.

The composite molding 12 includes an outer member 16 preferably of a thin stainless steel. In final form, the member 16 is arcuate in shape, in the embodiment illustrated, with inturned flanges 18 along its opposite edges and of predetermined length depending upon the particular use and location of the molding 12. The general cross-sectional shape of the molding may be varied within the scope of the present invention.

An inner molding member 20 is disposed within the outer member 16 and is also arcuate in shape and of such a width that the side edges of the member 20 are received within the recess formed by the flanges 18 to thereby hold the member 20 in position. The flanges 18 need only be of such a length that they extend slightly around the edges of the member 20 so that the member 20 is held in position.

The member 20 is of substantially the same length as the length of the member 16, and attaching means are formed integral with the member 20 so that the attaching means is integral with the molding 12 and may be readily attached to the supporting member without the necessity of using separate clips. The attaching means is provided by forming preferably generally rectangular shaped recesses 22 in the member 20 at spaced points therealong corresponding to the positions of the openings 14 in the supporting member. The manner in which the member 20 is formed and the attaching means formed integral therewith is illustrated in one step of the manufacture in Figure 3, in which the strip 20 is initially flat. The recesses 22 are preferably stamped out while the strip is flat and at the same time that the recesses are formed, the attaching means, generally indicated at 24, are also formed. The attaching means 24 are preferably within the recess at substantially the center thereof and comprises leg portion 26 having wedge shaped surfaces 28 adjacent the leading ends thereof which terminate in shoulders 30.

An elongated substantially rectangular recess 32 is provided between the legs 26, and the base of the recess 32 is spaced outwardly toward the leading ends of the legs 26 from the base of the recess 22. A slit 36 is formed through the member 22 from the base of the recess 32 extending beyond the base of the recess 22 toward the opposite side of the member 20 where the slit 36 communicates with an enlarged opening 38, preferably circular in shape, provided through the member 20. The width of the slot 36 is slightly exaggerated in the drawing for the purpose of illustration. The recess 22 with the leg 26, recess 32, slot 36, and openings 38 may be provided in the member 20 by a single stamping operation while the strip is in its flat condition. After the attaching means is thus formed, the legs 26 are bent along the crease line 40 which is preferably aligned with the base of the recess 22.

The assembly of the two members 16 and 20 to provide the composite molding 12 may be done in one of several ways. For example, the members may be placed together while they are both in a flat condition and then by passing the two members through rolls, they both may be bent to the arcuate shape shown and the flanges 18 simultaneously formed to provide the arcuate molding with the inner member 20 secured to the outer member 16. Also, the member 16 may be first arced and formed with the flanges 18 and the member 20 also arced, in which event the member 20 could be telescoped within the member 16 longitudinally thereof and held in position by the flanges 18.

The assembled composite molding, as illustrated in Figure 2, may then be applied to the supporting member, it being understood that the openings 14 are already provided in the supporting member 10 and are positioned to correspond to the positions of the attaching members 24. When applying the composite molding to the supporting member, it is merely necessary to align the attaching means 24 with the openings 14; and then, by a simple pressing operation, the legs 26 are forced through the openings. After they are received through the openings, the legs 26 spring or snap out so that the shoulders 30 engage the inner edges of the openings 14. In order to facilitate this assembly and in order to insure that the molding will remain tightly in place on the supporting member, the springiness of the legs 26 must be of a proper degree. This correct springiness of the legs 26 is provided in the construction of the present invention.

The action of the attaching means 24, and particularly of the legs 26, is particularly illustrated in the two views of Figure 5 in which the slit 36 is slightly exaggerated in order to bring out the action. The top view illustrates the composite molding before the legs 26 are forced through the openings in the supporting member 10, and the lower figure illustrates the action of the legs as they are being passed through the openings. Thus, as the legs 26 are forced through the openings, the sides of the openings force the legs together as they engage the wedge shaped edges 28 of the legs. This wedging action forces the legs together and causes separation of the slit 26, as illustrated in the lower figure. The edges of the slit 36 adjacent the base of the recess 32 at the point indicated at 44 engage and the forcing together of the legs causes the sides of the slits 36 to separate from the point 44 toward and beyond the crease line 40 to the opening 38. The communication of the slit 36 with the enlarged openings 38 also assist materially in permitting this separation of the slit to give the correct degree of resilience to the legs; and when the forward ends of the legs 26 have passed through the openings, they spring or snap outwardly so that the shoulders 30 engage the inner edges of the openings 14 to thereby rigidly hold the composite molding 12 in position on the supporting member 10.

When it is desired to use an extremely thin outer member 16, it may be that those portions of the thin outer member which overlie the recesses 22 may be distorted within such recesses when a buffing wheel is applied to the outer surface of the composite strip. In this event, in order to prevent such displacement within the recesses, an intermediate backing layer may be provided over the inner strip 20. Such intermediate layer would be of substantially the same shape as the outer member 16 and would serve to back up the outer layer 16 particularly over the recesses during the buffing operation. In this way the distortion referred to would be eliminated.

Formal changes may be made in the specific embodiment of the invention illustrated without departing from the spirit and substance of the invention, the scope of which is commensurate with the appended claims.

What is claimed is:

1. A composite molding adapted to be attached to a supporting member comprising an elongated outer member, an elongated inner member of substantially the same length as said outer member disposed within said outer member with the marginal edges of said outer member turned around the marginal edges of the inner member, said inner member being provided with a plurality of recesses at spaced intervals therealong in one edge thereof, an attaching means formed integral with said inner member within each of said recesses, said attaching means each including spaced leg members disposed substantially normal to the surface of said inner member and said leg members being resiliently disposed relative to each other.

2. A fastener construction comprising a sheet metal member having a base portion, spaced substantially straight leg members provided with a recess therebetween, said leg members lying in substantially the same plane and being disposed substantially normal to the surface of said base portion, the base of said recess being spaced toward the leading ends of said leg members from the point at which said leg members join said base portion, the outer edges of said leg members being wedged-shape adjacent the free ends thereof and forming shoulders thereon, means forming an opening in said base portion spaced from the point at which said leg members join said base portion, and a slit through said leg members and through said base portion joining said opening with said recess through the base thereof.

3. A fastener construction comprising a sheet metal member having a base portion, spaced, substantially straight leg members provided with a recess therebetween, said leg members being integral with said base portion and being disposed substantially normal to the surface of said base portion with the base of said recess spaced toward the free ends of said leg members from the point at which said leg members join said base portion, said leg members lying in substantially the same plane and being wedged-shaped adjacent the free ends thereof and forming shoulders thereon, means forming an opening in said base portion spaced from the point at which said leg members join said base portion, and a slit through said leg members and through said base portion joining said opening with said recess through the base thereof, the length of said slit between the base of the recess and the point at which said leg members join said base portion being substantially equal to the length of the slit in said base portion between the point at which said leg members join said base portion and the point at which said slit communicates with said opening.

AUGIE J. KELSEN.